(12) United States Patent
Massicotte

(10) Patent No.: US 9,247,713 B2
(45) Date of Patent: Feb. 2, 2016

(54) AUTOMATED FEEDING APPARATUS

(75) Inventor: René Massicotte, Batiscan (CA)

(73) Assignee: CAVADISTRIB. INC., Batiscan QC (CA)

(*) Notice: Subject to any disclaimer, the term of this patent is extended or adjusted under 35 U.S.C. 154(b) by 786 days.

(21) Appl. No.: 13/373,547

(22) Filed: Nov. 18, 2011

(65) Prior Publication Data
US 2012/0145085 A1   Jun. 14, 2012

Related U.S. Application Data

(60) Provisional application No. 61/344,921, filed on Nov. 18, 2010.

(51) Int. Cl.
*A01K 5/02* (2006.01)
*A01K 39/01* (2006.01)

(52) U.S. Cl.
CPC ............ *A01K 5/0275* (2013.01); *A01K 5/0258* (2013.01); *A01K 39/01* (2013.01)

(58) Field of Classification Search
CPC ..... A01K 5/02; A01K 5/0275; A01K 5/0114; A01K 5/258; A01K 39/01
USPC ............. 119/51.02, 51.11, 51.12, 52.1, 61.1, 119/61.31, 53, 57.7, 57.92
See application file for complete search history.

(56) References Cited

U.S. PATENT DOCUMENTS

| | | |
|---|---|---|
| 1,670,344 A | 5/1928 | Collins |
| 2,049,331 A | 7/1936 | Smith |
| 3,845,744 A | 11/1974 | Carr et al. |
| 4,020,736 A | 5/1977 | Petersen |
| 4,489,862 A | 12/1984 | Diem |
| 5,899,169 A | 5/1999 | Jenson |
| 6,116,189 A * | 9/2000 | Rundle ................. 119/51.5 |
| 7,083,069 B2 | 8/2006 | Wysong et al. |
| 7,591,264 B2 | 9/2009 | Beller |
| 7,690,538 B2 | 4/2010 | Dunlop et al. |
| 7,757,903 B2 | 7/2010 | Schwartz et al. |
| 2010/0018467 A1* | 1/2010 | Massicotte ............ 119/57.7 |

* cited by examiner

Primary Examiner — Peter M Poon
Assistant Examiner — Kathryn L Thompson
(74) Attorney, Agent, or Firm — Equinox IP; Franz Bonsang

(57) ABSTRACT

An automated feeding apparatus for animals comprises an inlet hopper having a discharge outlet provided with a feeder actuable in accordance with a predetermined feeding regime, the discharge outlet being of variable size. The discharge outlet is adjustable in length and depth to enable variation of volumetric flow therethrough.

7 Claims, 2 Drawing Sheets

AUTOMATED FEEDING APPARATUS

CROSS-REFERENCE TO RELATED APPLICATION

Benefit of U.S. Provisional Application for Patent Ser. No. 61/344,921, filed on Nov. 18, 2010, which is enclosed herein by reference, is hereby claimed.

FIELD OF THE INVENTION

The present invention relates to a feeding apparatus for animals and to a mode of operation thereof, and is more particularly concerned with such an apparatus for automatically feeding pellets or similar discrete comestible material to animals, such as horses or the like.

BACKGROUND OF THE INVENTION

It is well known in the art to provide a feeder for animals such as horses and the like. U.S. Pat. No. 3,845,744 issued to H. Carr on Nov. 5, 1974 provides for a feeder with a relatively complex mechanism for opening the doors one by one and ensuring that the system closes all doors when the lid is opened. Moreover, the constriction of the hopper could potentially block or choke the delivery of feed to the animal(s) with perturbing circumstances. Finally, the lid being positioned above the feeder significantly hampers the delivery of heavy bags of pellets, for example, which must be lifted above the feeder. U.S. Pat. No. 5,899,169 issued to B. Jenson et al. on May 4, 1999 shows hayracks which, if strong enough not to be damaged by the animal, provide for a more complicated and probably heavier feeder to build. In addition, a hazard will always exists on this design with an automatic opening of one of the doors while an animal is eating, potentially hurting the nose or nostrils of the animal.

Accordingly, there is a need for an improved universal automated feeding apparatus.

SUMMARY OF THE INVENTION

It is therefore a general object of the present invention to provide an improved automated feeding apparatus.

An advantage of the present invention is that the feeder apparatus is programmable to the extent that the feed magnitude and its timing and duration of operation can be controlled automatically and easily modulated in accordance with any variation in requirements as necessary.

Another advantage of the present invention is that the feeding apparatus provides for a clean delivery of the food material without blocking.

Still another advantage of the present invention is that the feeding apparatus is relatively simple and economically sound.

Another advantage of the present invention is that the feeding apparatus may be situated within an animal stable, stall or box or externally thereof, dependent upon the nature of the stable facility.

According to an aspect of the present invention, there is provided an automated feeding apparatus for animals consisting of an inlet hopper having a discharge outlet provided with a feeder actuable in accordance with a predetermined feeding regime, the discharge outlet being of variable size.

The feeder may be in the form of a motor driven screw feeder or auger, or equivalent, actuable by a programmable controller. The screw feeder or auger is associated with and disposed within the discharge outlet of variable size. The said discharge outlet is adjustable in length and depth to enable variation of volumetric flow therethrough. The outlet in this form may be manually adjustable or may be adjustable by appropriate remotely operable mechanisms.

The discharge outlet may be of trough like form adjustably mounted on the lower part of the hopper through the agency of pin and slot arrangements allowing adjustment in two planes. Suitable locking means are provided to secure the outlet in the chosen position and may consist of wing-nuts engageable with the threaded ends of the pins forming part of the arrangements as referred to above.

The feeding apparatus may be enclosed within a housing provided with a lid providing access to the hopper inlet, the housing encasing and thus protecting the feeder and its programmable drive. The housing may be so shaped as to form an internal chute to receive the discharged feed, there being an outlet opening in the housing at the relatively lower end of the chute. The housing may be mounted on a plinth, which forms and is shaped to provide a feed manger for the reception of the feed and for access by the animal to be fed.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, wherein.

DETAILED DESCRIPTION OF THE PREFERRED EMBODIMENTS

With reference to the annexed drawings the preferred embodiments of the present invention will be herein described for indicative purpose and by no means as of limitation with like numerals of reference being employed for like parts in differing embodiments of the invention or its details.

Figure 1:
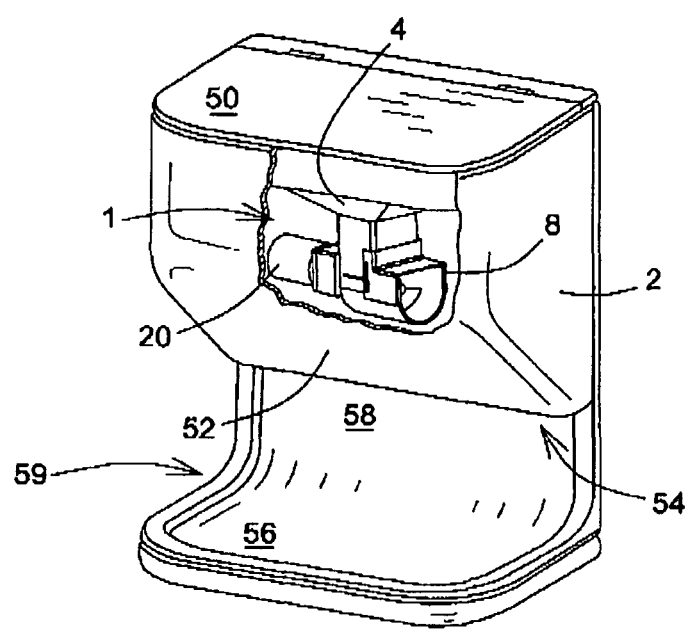
FIG. 1 is a simplified front perspective elevation of a feeding apparatus in accordance with an embodiment of the present invention, shown disposed within a housing illustrated with a cut away portion for the sake of clarity.

Referring first to FIG. 1 there is shown in perspective a front elevation of a feeding apparatus 1 mounted within a housing 2, to be described in greater detail infra, which is cut away for the sake of clarity to reveal the apparatus.

Figure 3:
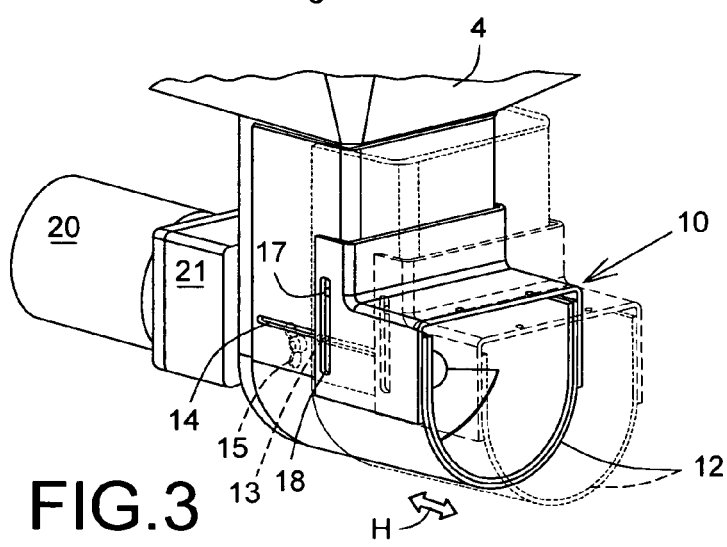
FIG. 3 is a view similar to FIG. 2, showing the discharge output being forwardly adjustable.

The apparatus 1 includes a hopper 4 providing an inlet (not shown) and an outlet region 6 distal from the inlet, the outlet region 6 in this example being of rectilinear shape, in particular of rectangular cross section. An outlet 8 as such is provided for the outlet region 6 and is comprised of an adjustable trough-like assembly 10. The assembly 10 is essentially telescopic with interleaving elements 12 which slide one within the other through the agency of a pin and slot arrangement 13, 14 or the like and are lockable in a chosen position by the tightening of wing-nuts 15 or the like in known manner. The telescoping of the elements 12 may conveniently be in a horizontal plane, as shown by arrows H in FIGS. 3 and 4.

Figure 2:
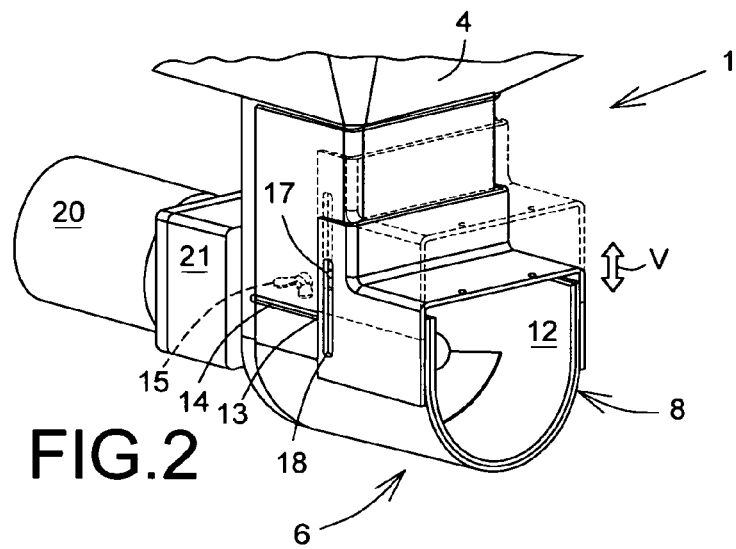
FIG. 2 is a front perspective view of the embodiment of FIG. 1, showing the discharge output in a first position.
Figure 4:
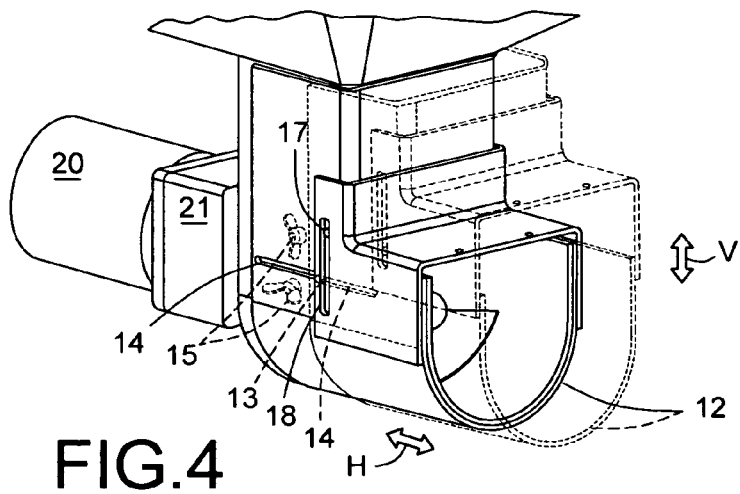
FIG. 4 is a view similar to FIG. 2, showing the discharge output being forwardly and upwardly adjustable.

The outlet 8 is also vertically adjustable in a substantially vertical plane, as shown by arrows V, again through the agency of suitable similar pin and slot arrangement 17, 18 in mutual engagement with the outlet region 6 as can be seen from FIGS. 2 and 4.

A drive motor 20 is mounted to the outlet region 6 on the opposite side thereof to the outlet 8 per se and is coupled via suitable gearing 21 to a rotor (not shown) which may be a feed screw or an auger for rotational movement such as in use to carry pelletted or other discrete feed through the outlet 8 for discharge as hereinafter described. A programmable controller (not shown) is provided for the control of the motor 20 to govern the timing, duration and frequency of its operation on a daily basis or otherwise and therefore that of the feeding of food through the feeder 1.

The housing 2 encases the feeder 1 and has at its relatively upper end a lid 50 which is openable to gain access to the hopper 4. The housing 2 is so shaped at its relatively lower end to provide a chute 52 beneath the feeder 1 such that the discharge of feed through the outlet 8 falls into the chute for discharge through an opening 54 into a feeding or manger area 56 therebeneath. It will be seen that the manger area 56 is open at the front of the housing 2 and is provided at its rear margin with an upright wall 58, the combination of the wall and the manger constituting a plinth 59 for the housing 2 which may be suitably affixed to the wall of a stable (not shown) for access by for example a horse or other animal accommodated therewithin.

In use, the feeder 1 mounted within the housing is charged through its hopper 4 with pellets, nuts or cubes of feed for feeding the animal, the feed descending in the hopper 4 into the outlet 8 whence it is dischargeable by actuation of the motor 20. The amount of feed is determined by the size of the outlet 8 which may be adjusted vertically and horizontally as indicated supra and accordingly the volume of feed delivered into the chute 52 of the housing and ultimately into the manger area 56 is defined in combination with the duration of the operation of the motor. As will be appreciated by the skilled artisan, the feeder is calibrated in accordance with the feeding regime of the animal concerned to ensure accurate feeding at appropriate times during the day.

It will be understood that whilst the specific embodiment of feeder relies on manual adjustment of the outlet configuration for the variation in the feed volume, automatic means may be provided.

Although the present invention of an automated feeding apparatus has been described with a certain degree of particularity, it is to be understood that the disclosure has been made by way of example only and that the present invention is not limited to the features of the embodiment described and illustrated herein, but includes all variations and modifications within the scope and spirit of the invention as herein after claimed.

I claim:

1. An automated feeding apparatus for animals comprises an inlet hopper having a discharge outlet provided with a feeder actuable in accordance with a predetermined feeding regime, wherein the invention consists in the feeder having the discharge outlet of variable and adjustable size, the discharge outlet being adjustable in telescopic manner horizontally and vertically and being adapted thereby to enable variation of volumetric flow therethrough wherein the feeder is in the form of a screw feeder adapted to be driven by a motor, the screw feeder being associated with and disposed within the discharge outlet of variable and adjustable size.

2. An automated feeding apparatus according to claim 1, wherein the adjustment of the discharge outlet is adapted to be effected manually.

3. An automated feeding apparatus according to claim 1, wherein the discharge outlet is in trough like form adjustably mounted on a lower part of the said hopper through the agency of threaded pin and slot arrangements allowing adjustment horizontally and vertically.

4. An automated feeding apparatus according to claim 3, wherein locking means are provided to secure the outlet in the selected position and comprise wing-nuts engageable with the pins.

5. An automated feeding apparatus according to claim 1, wherein the apparatus is enclosed within a housing provided with a lid providing access to the inlet hopper, the housing being adapted to encase and protect the feeder and the drive motor.

6. An automated feeding apparatus according to claim 5, wherein the housing is shaped to form an internal chute adapted in use to receive feed discharged from the feeder, and wherein the housing is provided with an outlet opening at the relatively lower end of the said chute.

7. An automated feeding apparatus according to claim 5, wherein the housing is mounted on a plinth forming and providing a feed manger for the reception of feed discharged by the feeder, the manger in use being accessible by the animal to be fed.

* * * * *